Jan. 25, 1944.   R. W. PEARSON ET AL   2,340,076
WELDING APPARATUS
Filed Sept. 27, 1941
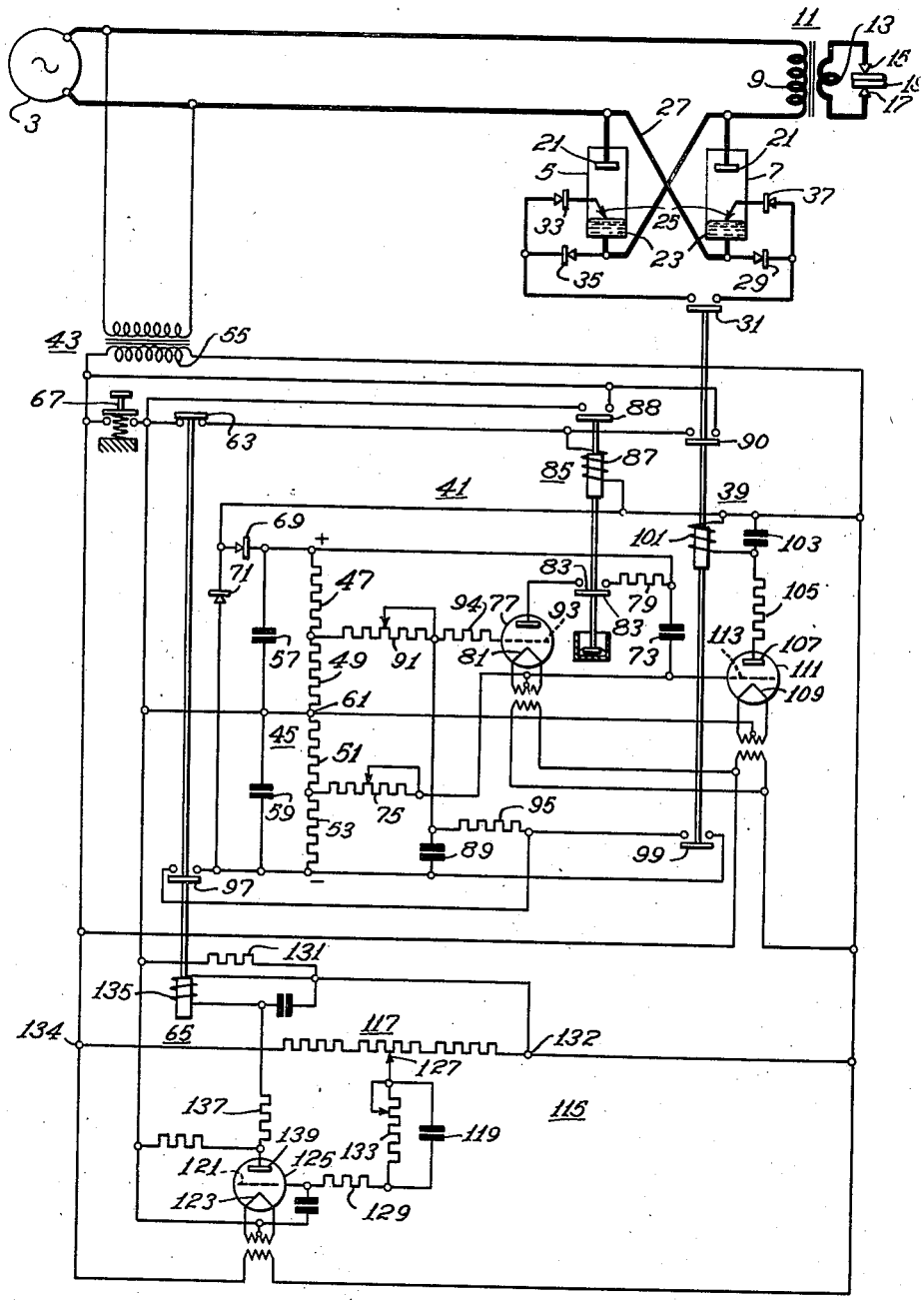
WITNESSES:
Edward Michaels
John R. Shipman
INVENTORS
Robert W. Pearson &
Slavo J. Murcek.
BY
Hymen Diamond
ATTORNEY Patented Jan. 25, 1944

2,340,076

UNITED STATES PATENT OFFICE 2,340,076

WELDING APPARATUS

Robert W. Pearson, Wilkinsburg, and Slavo J. Murcek, Duquesne, Pa., assignors to Westinghouse Electric & Manufacturing Company, East Pittsburgh, Pa., a corporation of Pennsylvania Application September 27, 1941, Serial No. 412,660

15 Claims. (Cl. 250—27)

This invention relates to an electronic control system and has particular relation to welding apparatus.

In resistance spot welding, highly uniform welds of good quality may be obtained by a method which is known as interrupted spot welding. A predetermined number of discrete impulses of current is supplied to the materials to produce each weld. Each impulse is of a predetermined length, and there is a predetermined time interval between impulses. In the usual practice, the welding current is supplied from an alternating-current source. Each impulse and the intervals between successive impulses are then measured in terms of half periods of the source.

The provision of a control system for an interrupted spot welder is a difficult problem. For practical reasons, the welder is employed in welding a number of different materials. These materials may have widely varying dimensions and a vast range of diverse properties. It is, therefore, vital that the control system be adjustable over a wide range to provide current impulses of various lengths with various time intervals between successive impulses.

A typical interrupted spot welder is described in the copending application, Serial No. 271,951, filed in the name of Finn H. Gulliksen on May 5, 1939, and assigned to the Westinghouse Electric & Manufacturing Company. In this copending application, welding current is supplied through a pair of ignitrons whose period of conductivity is controlled by a timing circuit employing a number of electric discharge devices. Another timing circuit, which also employs a number of discharge devices, is used to limit the time interval between successive current impulses. After a predetermined number of impulses are supplied, the operation of the system is interrupted by blocking the action of the timing circuits.

The system disclosed in the copending application operates satisfactorily in commercial use. However, for an art to progress, there must be a continual improvement. This improvement may appear in the apparatus in the form of simplified construction and operation with the accompanying decrease in cost. In an electronic control system, it is, of course, desirable to perform a given operation using a minimum number of discharge devices and control circuits while maintaining a high degree of accuracy.

It is, accordingly, an object of our invention to provide an interrupted spot welder having a simplified construction and operation.

Another object of our invention is to provide a new and improved electronic timing system for an interrupted spot welder.

A more general object of our invention is to provide a novel system for supplying power from a source to a load in discrete impulses, each impulse being of a predetermined length with a predetermined time interval between successive impulses.

Another object of our invention is to provide a simplified arrangement for supplying power from a source to a load for a preselected interval of time during which current is supplied in discrete impulses, each impulse persisting for a predetermined interval of time and the impulses occurring at time intervals of predetermined length.

More specifically, it is an object of our invention to provide an improved interrupted spot welding system which employs a minimum number of electric discharge valves and control circuits.

In accordance with our invention, current is supplied from a source to the welding transformer through a pair of ignitrons connected in anti-parallel. Firing of the ignitrons is controlled by an auxiliary alternating current circuit including an electric discharge valve whose conductivity depends upon the potential of a normally charged capacitor in its control circuit. The auxiliary circuit also includes means operable when the valve conducts current in each positive half period to effect a continuous supply of current through the ignitrons. When the capacitor potential is above a preselected value, the valve is maintained non-conductive. A second electric discharge valve is connected across the capacitor, and when this second valve becomes conductive, the capacitor is quickly discharged to render the first valve conductive. The second valve, of course, becomes non-conductive when the capacitor potential nears zero which occurs a short but definite time interval after the second valve becomes conductive. As long as the capacitor potential remains below a preselected value, the first valve conducts current in each positive half period. However, recharging of the capacitor at a selected rate is commenced immediately upon extinguishment of the second valve. The length of the interval during which current is conducted by the first valve is then controlled by adjusting the rate of charging of the capacitor.

When the first valve again becomes non-conductive, the charging of a second capacitor at a selected rate is initiated. The second capacitor is included in the control circuit of the second valve and is maintained in a discharged condition to prevent the second valve from becoming conductive while the first capacitor is recharging. After a predetermined interval of time, whose length depends upon the selected rate of charging of the second capacitor, the second valve is again rendered conductive. Thus, the period of conductivity of the first valve is determined by the rate of charging of the first capacitor, and the period of non-conduction is determined by the rate of charge of the second capacitor. An overall timing system is also employed to restrain the second valve from becoming conductive after a predetermined number of cycles of charging and discharging of the first capacitor.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawing, which is a diagrammatic view illustrating an embodiment of our invention.

As illustrated in the drawing, current is supplied from a source of alternating current 3 through a pair of ignitrons 5 and 7 connected in anti-parallel to the primary 9 of the welding transformer 11. The secondary 13 of the transformer is connected across the electrodes 15 and 17 in engagement with the material 19 to be welded. Each of the ignitrons includes an anode 21, a mercury pool cathode 23 and an igniter 25 in contact with the cathode. The ignition circuit of one of the ignitrons 5 may be traced from one side of the source 3 through a line 27, a rectifier 29, contactor 31, a rectifier 33, the igniter 25 and cathode 23 of the ignitron 5 and the primary 9 of the transformer to the other side of the source. The ignition circuit of the other ignitron 7 may be similarly traced from the other side of the source 3 through the primary 9 of the transformer, a rectifier 35, contactor 31, a rectifier 37, the igniter 25 and cathode 23 of the ignitron 7 to the source. Contactor 31 forms a part of a control relay 39 and is normally open. When this contactor 31 is closed, the ignitrons are rendered conductive alternately in successive half periods of the source.

The operation of the control relay is controlled by a timing system indicated generally at 41. Power is supplied to the system from the source 3 through an auxiliary transformer 43. A voltage divider 45 having four sections 47, 49, 51, and 53 is arranged to be energized from the secondary 55 of the auxiliary transformer 43. A filter capacitor 57 is connected across the two upper sections 47 and 49 of the divider, and another filter capacitor 59 is connected across the two lower sections 51 and 53. The center tap 61 of the divider is connected through a push button switch 67 to one side of the secondary 55. The outer terminals of the voltage divider 45 are connected through rectifiers 69 and 71 to the other side of the secondary 55. The direction of current flow through the rectifiers 69 and 71 is such that the capacitor 57 across the two upper sections of the divider is charged in a first half period, and the other capacitor 59 across the two lower sections, is charged in the opposite half period. This rectifier capacitor arrangement is a typical voltage doubler circuit which is well-known in the art.

A control capacitor 73 is connected across the three upper sections 47, 49 and 51 of the divider through a variable resistor 75. An electric discharge valve 77 of the arc-like type, in series with a small resistor 79, is connected directly across the control capacitor 73 with its cathode 81 connected to the negative plate of the capacitor. The circuit through the valve 77 is controlled by a contactor 83 of another relay 85. The operating coil 87 of this relay 85 is energized from the secondary 55 of the auxiliary transformer through normally closed contactor 63 of relay 65 when the push button switch 67 is closed. A pair of holding circuits are connected across switch 67, one through contactor 88 of relay 85 and the other through contactor 90 of relay 39.

Another capacitor 89 is connected across the three lower sections 49, 51 and 53 of the divider through another variable resistor 91. The control circuit of the discharge valve 77 extends from the grid 93 through a grid resistor 94, capacitor 89 to the negative terminal of divider 45, and thence through section 53 of the divider and resistor 75 to the cathode 81. When capacitor 89 is charged, its potential counteracts the biasing potential of section 53 and the grid 93 becomes positive with respect to its cathode 81, permitting the valve to be rendered conductive. However, when the capacitor 89 is discharged, the valve is prevented from becoming conductive by the negative potential appearing across section 53 of the divider. The capacitor 89 may be discharged through a resistor 95 by the closing of a normally open contact 97 of relay 65 or by the closing another contact 99 of the control relay 39.

The operating coil 101 of the control relay 39 is arranged to be energized from the secondary 55 of the auxiliary transformer 43. The energizing circuit may be traced from one side of the secondary 55 through a parallel circuit consisting of the operating coil 101 on one side and a capacitor 103 on the other side, a current-limiting resistor 105, the anode 107 and cathode 109 of a control electric discharge valve 111, the center tap 61 of the divider 45, and contactor 88 of relay 85 to the other side of the secondary 55. The control valve 111 is of the arc-like type, and its grid 113 is connected to the negative plate of the control capacitor 73.

The control circuit of the valve 111 extends from grid 113, through the control capacitor 73, sections 47 and 49 of divider 45 to the cathode 109. Thus, when the control capacitor is charged, the grid 113 is negative with respect to the cathode 109. However, when the capacitor 73 is discharged, the grid 113 becomes positive, permitting the control valve 111 to be rendered conductive in each positive half period of the source. The capacitor 103 in parallel with the operating coil 101 of the control relay 39 is of such dimensions that the coil is maintained energized between successive positive half periods. It is then evident that the control relay 39 is energized as long as the control capacitor potential remains below the biasing potential provided by the two upper sections 47 and 49 of the divider 45.

An overall timing system 115 is also provided to limit the number of current impulses which may be supplied in one operation. A voltage divider 117 is connected directly across the secondary 55 of the auxiliary transformer 43. A capacitor 119 is then charged by the rectified leakage current through the grid 121 and cathode 123 of another electric discharge valve 125 of the arc-like type. The circuit for charging the capacitor 119 may be traced from the center tap 127 of the divider 117 through the capacitor 119, a grid resistor 129, the grid 121 and cathode 123 of the valve 125 and a small resistor 131 to one terminal 132 of the divider 117. The cathode 123 of the valve is also connected to the other terminal 134 of the divider 117 through the push button switch 67 and/or contactor 88. Thus, when the push button switch 67 and/or contactor 88 is closed, the cathode 123 of the valve 125 is connected to both sides of the voltage divider 117 and charging of the capacitor 119 is halted. The capacitor 119 then discharges through a variable resistor 133 in parallel therewith. The negative plate of the capacitor 119 is connected to the grid 121 of the valve so that the valve remains non-conductive while the capacitor is charged. However, when the capacitor becomes discharged after an interval of time determined by the setting of the resistor 133, the valve 125 is rendered conductive. Current then flows from one terminal 132 of the voltage divider 117 through the operating coil 135 of the relay 65, a current-limiting resistor 137 to the anode 139 of the valve 125. The circuit continues from the cathode 123 of the valve through the contactor 88 to the other side of the divider 117. Thus, a predetermined time interval after the push button 67 is first closed, the relay 65 is energized and one of its contactors 97 closes to maintain the capacitor 89 of the timing system 41 discharged while the other contactor 63 breaks one of the holding circuits around push button switch 67.

To initiate a welding operation, the push button switch 67 is manually closed. Voltage divider 45 is then energized, and after a time delay, the relay 35 is operated to close the circuit through the discharge valve 77. During the time delay, the control capacitor 73 and the other capacitor 89 are charged. When the circuit through the valve 77 is closed by the contactor 83, the valve immediately becomes conductive to discharge the control capacitor 73. The control capacitor 73 discharges to almost zero potential in a short but definite time interval, and the valve 77 becomes non-conductive. Immediately thereafter, recharging of the control capacitor 73 begins. However, when the control capacitor 73 is discharged, the control valve 111 becomes conductive to conduct current in each positive half period of the source. The operating coil 101 of the control relay 39 is thus energized and maintained energized between positive half periods by capacitor 103 to complete the firing circuits of the ignitrons 5 and 7. The ignitrons are then rendered conductive alternately in successive half periods to energize the welding transformer 11.

As the control capacitor 73 recharges, it eventually rises above the critical potential of the control valve 111 so that it no longer becomes conductive in the positive half periods. As previously pointed out, the time during which the control valve 111 is conductive depends upon the charging rate of the control capacitor 73. When the control valve 111 becomes non-conductive, the control relay 39 breaks the ignition circuits of the ignitrons, halting the flow of welding current.

As the control capacitor 73 is first discharged, the control relay 39 is energized and its contactor 99 closes the discharging circuit of the capacitor 89. While this capacitor 89 is maintained in a discharged condition, the valve 77 cannot become conductive so that recharging of the control capacitor 73 may proceed without interruption. However, when the control relay 39 is deenergized, the discharging circuit of the capacitor 89 is opened and recharging of the capacitor at a selected rate is initiated. Upon charging of the capacitor to a potential above the critical potential of the valve 77, the latter is again rendered conductive to discharge the control capacitor 73 and another cycle is started.

When the push button switch 67 is initially closed, the precharged capacitor 119 in the overall timing circuit 115 begins to discharge at a predetermined rate depending upon the setting of the resistor 133 in parallel therewith. This resistor is adjusted so that the capacitor potential drops to a point permitting firing of the valve 125 after a predetermined number of cycles of charging and discharging the control capacitor 73. When the valve 125 becomes conductive, the relay 65 is energized and its contactor 97 closes the discharging circuit of the capacitor 89 and maintains the capacitor in a discharged condition. As a result, further operation of the timing system 41 is prevented. Energization of relay 65 also opens contactor 63 to deenergize relay 85 whose contactor 88 breaks one of the holding circuits around switch 67. The other holding circuit is completed through contactor 90 of control relay 39. Thus, the welding operation may not be halted in the middle of a welding impulse.

Although we have shown and described a specific embodiment of our invention, we are fully aware that many modifications thereof are possible. Our invention, therefore, is not to be restricted except insofar as is necessitated by the prior art and by the spirit of the appended claims.

We claim as our invention:

1. For use in supplying current from a source to a load, the combination comprising electric discharge valve means for controlling current flow from said source to said load, a capacitor, means for controlling said valve means in accordance with the potential of said capacitor, means constantly tending to charge said capacitor at a preselected rate, and means for temporarily discharging said capacitor in a chosen time interval a predetermined time after its potential rises to a preselected magnitude.

2. In apparatus for controlling a work circuit, the combination comprising a normally charged capacitor, means for controlling said work circuit in accordance with the potential of said capacitor, means for discharging said capacitor, means for recharging said capacitor at a preselected rate after it is discharged, and timing means for effecting re-operation of said discharging means after a predetermined time delay, said control means including means for initiating operation of said timing means when said capacitor potential rises to a preselected value.

3. In apparatus for controlling a work circuit, the combination comprising a normally charged capacitor, means for controlling said work circuit according to whether the potential of said capacitor is above or below a preselected intermediate value, means for discharging said capacitor for a definite time interval, means for thereafter recharging said capacitor at a preselected rate so that the capacitor potential rises above said preselected value a predetermined time after said capacitor is discharged, and timing means for effecting re-operation of said discharging means after a predetermined time delay, said control means including means for initiating operation of said timing means when said potential rises above said preselected value.

4. For use in supplying power from a source to a load, the combination comprising an electric discharge valve interposed between said source and load, a normally charged capacitor, means for controlling said valve in accordance with the potential of said capacitor, means for discharging said capacitor for a definite time interval, means for thereafter recharging said capacitor at a preselected rate, and timing means for effecting re-operation of said discharging means after a predetermined time delay, said control means including means for initiating operation of said timing means when said capacitor potential rises to a preselected value.

5. For use in supplying power from a source of alternating current to a load, the combination comprising an electric discharge valve of the arc-like type interposed between said source and load, a control circuit for said valve including a normally charged capacitor, said control circuit being effective to render said valve conductive in each positive half period of the source only while the potential of said capacitor has a certain relative magnitude with respect to a preselected value, means for discharging said capacitor for a definite time interval, means for thereafter recharging said capacitor at a preselected rate so that the capacitor potential rises above said preselected value a predetermined time after said capacitor is discharged, timing means for effecting re-operation of said discharging means after a predetermined time delay, and means controlled by said valve for initiating operation of said timing means when said capacitor potential rises above said preselected value.

6. In apparatus for controlling a work circuit, the combination comprising a normally charged capacitor, means for controlling said work circuit in accordance with the potential on said capacitor, said control means being effective to place said work circuit in one condition when said capacitor potential is above a preselected value and in a second condition when said potential is below said preselected value, means for discharging said capacitor during a definite time interval to a potential below said preselected value, means for recharging said capacitor at a preselected rate so that said capacitor potential rises above said preselected value a predetermined time after said potential passes below said preselected value, and timing means operable by said control means for effecting re-operation of said discharging means a preselected time after said potential rises above said preselected value.

7. In apparatus for controlling a work circuit, the combination comprising a normally charged capacitor, means for controlling said work circuit according to whether the potential of said capacitor is above or below a preselected intermediate value, an electric discharge valve connected across said capacitor, means for rendering said valve conductive to discharge said capacitor, said valve becoming non-conductive when said capacitor is discharged, means for thereafter recharging said capacitor at a preselected rate so that the capacitor potential rises above said preselected value a predetermined time after said capacitor is discharged, and timing means for effecting re-operation of said means for rendering the valve conductive after a predetermined time delay, said control means including means for initiating operation of said timing means when said capacitor potential rises above said preselected value.

8. In apparatus for controlling a work circuit, the combination comprising a normally charged capacitor, means for controlling said work circuit according to whether the potential of said capacitor is above or below a preselected intermediate value, an electric discharge valve connected across said capacitor, valve control means for rendering said valve conductive to discharge said capacitor, said valve becoming non-conductive when said capacitor is discharged, means operable by said circuit control means for restraining said valve means from becoming conductive while said capacitor potential is below said preselected value, and means for recharging said capacitor at a preselected rate so that its potential rises above said preselected value a predetermined time after said capacitor is discharged, said valve control means including timing means for causing said valve to be rendered conductive a predetermined time after said restraining means becomes inoperative.

9. In apparatus for controlling a work circuit, the combination comprising a normally charged capacitor, means for controlling said work circuit according to whether the potential of said capacitor is above or below a preselected intermediate value, a second capacitor, means for charging said second capacitor at a predetermined rate, means responsive to a predetermined charge on said second capacitor for tempoarily discharging said first capacitor for a definite time interval, means operable by said control means for discharging said second capacitor and maintaining it discharged while said first capacitor potential is below said preselected value, and means for recharging said first capacitor at a preselected rate so that its potential rises above said preselected value a predetermined time after it is discharged, said second capacitor charging means becoming re-operative when said second capacitor discharging means becomes inoperative, whereby said first capacitor discharging means is re-operated a predetermined time after said first capacitor potential rises above said preselected value.

10. In apparatus for controlling a work circuit, the combination comprising a pair of normally charged capacitors, means for controlling said work circuit in accordance with the potential on the first of said capacitors, said control means being effective to place said work circuit in one condition when said first capacitor potential is above a preselected value and in a second condition when said potential is below said preselected value, means for discharging said first capacitor for a definite time interval to a value below said preselected value, means operable by said control means for discharging the second capacitor and maintaining it discharged while the first capacitor potential is below said preselected value, means for recharging said first capacitor at a preselected rate so that said first capacitor potential rises above said preselected value a predetermined time after said potential passes below said preselected value, means for recharging said second capacitor at a predetermined rate when the first capacitor charge rises above said preselected value, means for effecting re-operation of said first capacitor discharging means when said second capacitor attains a predetermined potential, and means for adjusting the rate of charge of each of said capacitors.

11. In apparatus for controlling a work circuit, the combination comprising a normally charged capacitor, means for controlling said work circuit according to whether or not the potential of said capacitor is below a preselected intermediate value, an electric discharge valve connected across said capacitor, control means for said valve including a second capacitor and means for charging said second capacitor at a predetermined rate, said control means being effective when said second capacitor attains a predetermined potential to render said valve conductive and discharge said first capacitor for a definite time interval, means operable by said circuit control means for discharging said second capacitor and maintaining it discharged while said first capacitor potential is below said preselected value, and means for recharging said first capacitor at a preselected rate so that its potential rises to said preselected value a predetermined time after it is discharged, said second capacitor charging means becoming re-operative when said second capacitor discharging means becomes inoperative, whereby said valve is rendered conductive a predetermined time after said first capacitor potential rises to said preselected value.

12. For use in supplying power from a source of alternating current to a load, the combination comprising an electric discharge value of the arc-like type interposed between said source and load, a control circuit for said valve including a normally charged capacitor, said control circuit being effective to render said valve conductive in each positive half period of the source only while the potential of said capacitor has a certain relative magnitude with respect to a preselected value, a second electric discharge valve connected across said capacitor, means for rendering said second valve conductive to discharge said capacitor for a definite time interval, said second valve becoming non-conductive when said capacitor is discharged, means for thereafter recharging said capacitor at a preselected rate so that the capacitor potential rises above said preselected value a predetermined time after said capacitor is discharged, timing means for effecting re-operation of said means for rendering the valve conductive after a predetermined time delay, and means controlled by said first valve for initiating operation of said timing means when said capacitor potential rises above said preselected value.

13. For use in supplying power from a source of alternating current to a load, the combination comprising an electric discharge valve of the arc-like type interposed between said source and load, a control circuit for said valve including a normally charged capacitor, said control circuit being effective to render said valve conductive in each positive half period of the source only while the potential of said capacitor has a certain relative magnitude with respect to a preselected value, a second capacitor, means for charging said second capacitor at a predetermined rate, means responsive to a predetermined charge on said second capacitor for discharging said first capacitor for a definite time interval, means controlled by said valve for discharging said second capacitor and maintaining it discharged while said first capacitor potential is below said preselected value, and means for recharging said first capacitor at a preselected rate so that its potential rises above said preselected value a predetermined time after it is discharged, said second capacitor charging means becoming operative when said second capacitor discharging means becomes inoperative, whereby said first capacitor discharging means is re-operated a predetermined time after said first capacitor potential rises above said preselected value.

14. For use in supplying power from a source of alternating current to a load, the combination comprising an electric discharge valve of the arc-like type interposed between said source and load, a control circuit for said valve including a normally charged capacitor, said control circuit being effective to render said valve conductive in each positive half period of the source only while the potential of said capacitor has a certain relative magnitude with respect to a preselected value, a second electric discharge valve connected across said capacitor, control means for said second valve including a second capacitor and means for charging said second capacitor at a predetermined rate, said control means being effective when said second capacitor attains a predetermined charge to render said second valve conductive and discharge said first capacitor for a definite time interval, means controlled by said first valve for discharging said second capacitor and maintaining it discharged while said first capacitor potential is below said preselected value, and means for recharging said first capacitor at a preselected rate so that its potential rises above said preselected value a predetermined time after it is discharged, said second capacitor charging means becoming operative when said second capacitor discharging means becomes inoperative, whereby said second valve is rendered conductive a predetermined time after said first capacitor potential rises above said preselected value.

15. For use in supplying current from a source to a load, the combination comprising electric discharge valve means for controlling current flow from said source to said load, a capacitor, means for controlling said valve means in accordance with the potential of said capacitor, means constantly tending to charge said capacitor at a preselected rate, and means for temporarily discharging said capacitor in a chosen time interval a predetermined time after its potential rises to a preselected magnitude, current flow to said load through said valve means being initiated on each discharge of said capacitor and being terminated when the charge on said capacitor attains said predetermined magnitude.

ROBERT W. PEARSON.
SLAVO J. MURCEK.